United States Patent [19]

Duchateau et al.

[11] E Re. 29,129

[45] Reissued Feb. 1, 1977

[54] METHOD OF MANUFACTURING ELEMENTS OF CRYSTALLIZED SUGAR

[75] Inventors: Georges François Duchateau, Tienen; Paul Joseph Dewulf, Outgaarden, both of Belgium

[73] Assignee: Raffinerie Tirlemontoise, Brussels, Belgium

[22] Filed: May 22, 1975

[21] Appl. No.: 580,007

Related U.S. Patent Documents

Reissue of:

[64] Patent No.: 3,756,855
Issued: Sept. 4, 1973
Appl. No.: 148,042
Filed: May 28, 1971

[30] Foreign Application Priority Data

June 3, 1970 Luxembourg ..... 61049

[52] U.S. Cl. ..... 127/63; 34/32; 127/30

[51] Int. Cl.[2] ..... C13F 5/00

[58] Field of Search ..... 127/30, 63

[56] References Cited

UNITED STATES PATENTS

| | | | |
|---|---|---|---|
| 1,216,554 | 2/1917 | Engel | 127/63 X |
| 2,249,624 | 7/1941 | Bichowsky | 34/27 |
| 3,063,158 | 11/1962 | McFarland | 34/32 |
| 3,175,299 | 3/1965 | Boucher | 127/63 X |
| 3,257,738 | 6/1966 | Margittai | 34/27 |

FOREIGN PATENTS OR APPLICATIONS 71,817 5/1916 Austria

OTHER PUBLICATIONS

Sugar Industry Abstracts, 27, Abs. 585, p. 139 (1965).

Chemical Abstracts, 35: 5739[4] (1941).

Chemical Abstracts, 48: 11094f (1954).

A. J. Wallis-Tayler, "Sugar Machinery", pp. 360–364, William Rider & Son, London, 1924.

*Primary Examiner*—Morris O. Wolk
*Assistant Examiner*—Sidney Marantz
*Attorney, Agent, or Firm*—Sughrue, Rothwell, Mion, Zinn & Macpeak

[57] ABSTRACT

[Method for drying crystallized sugar in the presence of a heated environment, wherein said environment has a relative humidity less than, but close to the equilibrium relative humidity of the sugar to be dried, at the temperature of the environment. This method permits crystallized sugar to be obtained in bright crystals and to exhibit physical characteristics similar to those of products produced by the Adant method, such as hardness, resistance to abrasion, porosity, rate of dissolution, and density.]

*A method for manufacturing elements of crystallized sugar, such as lumps, slabs and loaves thereof, comprising the steps of moistening the crystallized sugar, molding and compressing the sugar into elements and then drying the elements at a drying temperature wherein the molding and compression of said moistened sugar are carried out at said drying temperature and in an environment which during said drying has a relative humidity less than 100% but more than 85% of the equilibrium relative humidity of the sugar at said drying temperature. This method permits elements of crystallized sugar to be obtained having bright crystals and exhibiting physical characteristics similar to those of products produced by the Adant method, such as hardness, resistance to abrasion, porosity, rate of dissolution, and density.*

3 Claims, 3 Drawing Figures

Figure 1:
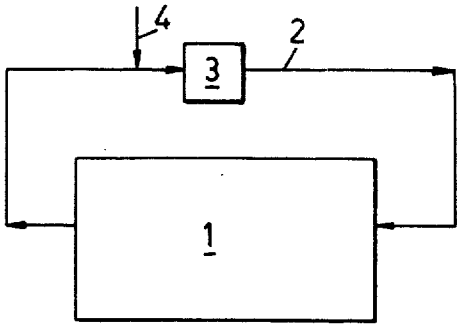

INVENTORS
GEORGES F. DUCHATEAU
PAUL J. DEWULF
BY Sughrue, Rothwell, Mion, Zinn & Macpeak
ATTORNEYS

METHOD OF MANUFACTURING ELEMENTS OF CRYSTALLIZED SUGAR

Matter enclosed in heavy brackets [ ] appears in the original patent but forms no part of this reissue specification; matter printed in italics indicates the additions made by reissue.

The present invention relates to a method [ for drying ] *of manufacturing elements of* crystallized sugar within a heated environment.

By the term *elements of* "crystallized sugar" must be understood within the scope of the present patent application in particular [ crystallized sugar in bulk, ] lump sugar, crystallized sugar in slabs as well as crystallized sugar in loaves.

The aim of the invention is to provide a drying method which may be used:

[(a) For the manufacture of crystallized and granulated sugar if it is desired to obtain bright crystals; ]

[(b)] *(a)* For the manufacture of lumps, slabs and loaves of sugar, by molding and compression, in order to provide products having physical characteristics similar to those of products furnished by the Adant method the prinicipal physical characteristics aimed at are: hardness, resistance to abrasion, porosity, rate of dissolution, density.

[(c)] *(b)* For the manufacture of lumps, slabs and loaves of sugar by the Adant method, in order to improve the physical characteristics which are already excellent.

According to present drying methods for sugar, sugar is placed in an environment at as high a temperature as possible and of fairly low humidity. Consequently the water included in the syrup surrounding the crystals evaporates very rapidly which results in the syrup becoming sursaturated with sugar and, consequently, a very fast crystallization takes place; it follows that instead of being deposited on the crystals present the sugar included in the syrup crystallizes in an irregular fashion, in the majority in the shape of very fine grains, which affect unfavorably the physical characteristics of the finished product, such as hardness, resistance to abrasion, porosity, rate of dissolution and density. When it is a question of sugar in lumps, slabs, loaves, the very fine grains adhere inadequately to the existing crystals, so that the latter are poorly joined together. Moreover, such very fine grains clog the voids between the crystals.

It may be of interest to recall here that when moist sugar is placed in an atmosphere of more or less humid air, two equilibria are simultaneously set up between the three phases present (crystals, syrup and air):

An equilibrium between the crystals and the syrup covering them, the syrup being the more enriched in sugar the higher its temperature and which subsists in the state of saturation, either by dissolving sugar from the crystals, or by crystallizing part of its sugar.

An equilibrium between the water included in the syrup which covers the crystals and the water contained in the air surrounding the crystals-syrup mixture. This equilibrium is by far the most important, as it is the one which, in the last resort, conditions the first one. This equilibrium is reached when the vapor tension of the syrup is equal to that of the air with which it is in contacting relationship.

It is possible, when studying such equilibrium, to use the concept of "relative humidity," which is the actual vapor tension at the temperature considered, expressed as a percentage of the saturating vapor tension of the sugar to be dried at the same temperature; the value at equilbrium is then termed "equilibrium relative humidity." When the relative humidity of the air is less than that at equilibrium sugar dries; otherwise it humidifies. This equilibrium relative humidity is mainly conditioned by the purity of the sugar and by the temperature.

In order to meet the disadvantages of the known drying method, in the method according to the invention, the heated environment in which the sugar dries has a relative humidity less than, but close to the equilibrium relative humidity of the sugar to be dried, at the temperature of said environment. By proceeding in this manner the supersaturation of the syrup surrounding the crystals is maintained in a zone which prevents crystallization in the shape of fine grains, but permits on the contrary to direct it onto existing crystals.

The process according to the invention is particularly suitable for the manufacture of sugar into elements achieved by molding and compressing such as lumps, slabs, loaves. According to this implementation of the method according to the invention, the mixture of crystallized sugar and water is brought to the drying temperature and moulding and compression are carried out in an environment having substantially the same conditions of temperature and relative humidity as those which shall rule during drying. By processing in this manner it is not necessary to heat up the moulded and compressed elements to ambient temperature, without losing water by evaporation, which would represent a delicate operation of the process, as regards the control of the ambient relative humidity.

Other details and features of the invention will become apparent from the description hereinafter given by way of non-limiting example, particularly with reference to the accompanying drawing, the three figures of which show three modified forms of plant layouts for working the process according to the invention.

Each of the figures shows a drying enclosure 1 wherein are brought in either the crystallized or granulated sugar in bulk after centrifuging, or elements such as lumps, slabs, loaves obtained by moulding and compression or by the Adant method.

The temperature of the enclosure 1 is selected as high as possible, generally between 75° C. and 85° C., but if it is desired to prevent the sugar taking on colour again, the temperature should for preference be kept below 80° C. Knowing the purity of the sugar to be dried and the drying temperature being set, the equilibrium relative humidity is determined and the relative moisture at which drying inside the enclosure 1 is carried out is then selected, i.e. it will be less than 100% but for preference exceed 85% of the equilibrium relative humidity of the sugar to be dried.

Various means may be applied in order to keep the enclosure 1 at the selected conditions of temperature and relative humidity.

According to FIG. 1, conditioned air, admitted to the enclosure, flows inside a circuit 2 wherein is mounted a selected temperature and relative humidity conditioning set 3; upstream of the conditioning set 3 is branched off a fresh air inlet 4 in order to make good possible losses of circulating air.

Figure 2:
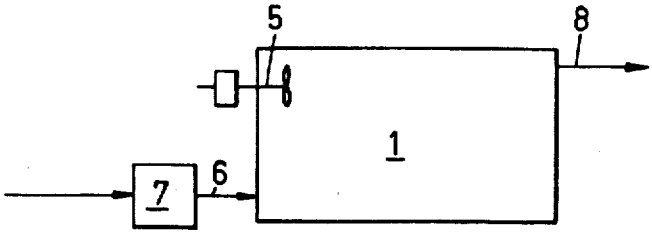

According to FIG. 2, a fan 5, provided inside the enclosure 1, forces the conditioned air admitted at 6, after having flown through a conditioning set 7 receiving the fresh air to flow in circular manner inside the enclosure, before leaving in 8.

Figure 3:
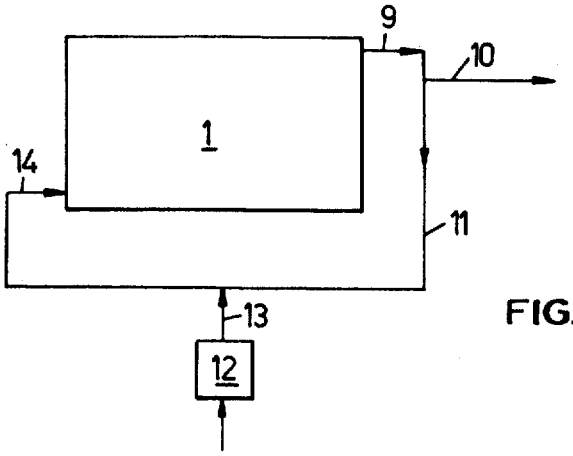

According to FIG. 3, the air leaving the enclosure 1 in 9 is partially discharged to atmosphere in 10 and partially returned to the circuit in 11; the air discharged is replaced by fresh air which passes through a conditioning set 12 and is mixed in 13 with the portion of air not discharged to atmosphere, the mixture being subsequently delivered in 14 to the enclosure 1.

For drying elements such as lumps, slabs, loaves, obtained by moulding and compression, the mixture of sugar and water is moulded and compressed under the same conditions of temperature and relative humidity as those ruling inside the drying enclosure 1. The operations of moulding and compression may be carried out either in a zone provided to that effect of the enclosure 1, or inside a chamber separate from, but connected to the enclosure 1.

This manner of proceeding offers certain advantages compared to known sugar moulding and compression methods, carried out under ordinary drying conditions; indeed, the hot mixture of sugar and moistening water is more fluid than the same mixture when cold, which affords greater ease of moulding; moreover, the hot sugar syrup surrounding the crystals being richer in sugar and therefore of higher density, performs better as a lubricant and enables the crystals to slide more easily one on top of another, which makes the compression easier and ultimately results in a higher density of the finished product.

EXAMPLE

The sugar considered is a granulated sugar of 99.95% purity, the equilibrium relative humidity thereof being 82% in a temperature environment equal to 80° C.

The sugar and the water needed for moistening are brought separately to the temperature of 80/82° C. and mixed in the ratios of 2 kgs. of water for 100 kgs. of sugar. The mixture, kept at 80° C. is then moulded and compressed in an atmosphere of 80° C. temperature and 72% of relative humidity. The products are subsequently removed from the mould and dried in an atmosphere identical to that of moulding and compressing. The drying time for lumps of sugar having a weight of 5 to 6 grams and an initial moisture of 2% at the start, amounted to 2 hours. The dried products may be packed immediately following their cooling.

Under these conditions lumps, slabs or loaves of sugar are obtained having physical characteristics similar to those of Adant sugar.

Below are listed average values of the results of tests carried out on a lot of samples:

| RESULTS | A | B | C |
|---|---|---|---|
| Time of dissolution, min. | 4 | 4 | 14 |
| Test of suction resistance | 10 | 10 | 2 |
| Test of resistance to abrasion, percent | 93 | 93 | 85 |

-continued

| RESULTS | A | B | C |
|---|---|---|---|
| Density | 1.1 | 1.1 | 1.05 |

NOTES:
A. Lumps of sugar obtained by the Adant method and dried in a conventional manner
B. Lumps of sugar moulded, compressed and dried according to the method of this invention.
C. Lumps of sugar moulded, compressed and dried according to a conventional method.

The tests were carried out as follows:

Time of dissolution: A lump of sugar is placed on a fine mesh sieve and the whole suspended in distilled water at 20° C. The time of dissolution is determined by monitoring the time needed to bring the weight of the immersed piece of sugar down to zero. In the case of compressed lumps, the piston face is positioned on top.

Test of suction resistance: A lump of sugar is placed inside a rubber appliance connected to a vacuum source. The lump of sugar is immersed in distilled water at 20° C., withdrawn from the water and subsequently dried by suction. This operation is repeated until the lump of sugar collapses. The result of the test is the number of times the lump of sugar resists such operation before collapsing.

Test of resistance to abrasion: This test comprises placing four lumps of sugar in a cylindrical box of 250 cc. which rotates around an axis inclined with reference to the symmetry axis thereof, at the rate of 45 r.p.m. for one hour. The result of the test is the percentage by weight of the lumps after abrasion, with reference to the initial weight of the lumps of sugar subjected to the test.

Density: This is based on the weight and the volume of the tested lumps of sugar.

We claim:

[ 1. A method for drying crystallized sugar within a heated environment wherein the said environment has a relative humidity less than, but close to the equilibrium relative humidity of the sugar to be dried, at the temperature of said environment.]

[ 2. A method as claimed in claim 1, wherein for drying elements of crystallized sugar achieved by molding and compressing crystallized sugar, the mixture of crystallized sugar and water is brought to the drying temperature and molding and compression are carried out in an environment having substantially the same conditions of temperature and relative humidity as those which shall obtain during drying.]

[ 3. A method as claimed in claim 1, wherein the drying environment has a relative humidity less than 100% but exceeding 85% of equilibrium relative humidity.]

[ 4. A method as claimed in claim 1, wherein the drying temperature is as high as possible in order to increase the rate of crystallization.]

5. Method as claimed in claim [ 4 ] *7*, wherein the drying temperature is between 75° C. and 85° C.

*6. A method according to claim 7, wherein the humidity conditions during molding and compression are substantially the same as during drying.*

*7. A method of manufacturing lumps, slabs and loaves of crystallized sugar, comprising the steps of moistening the crystallized sugar, molding and compressing the sugar into lumps, slabs or loaves and drying said lumps, slabs or loaves at a drying temperature wherein molding and compression of said moistened sugar are carried out at said drying temperature and wherein said molding and compression and drying are carried out in an environment which has a relative humidity less than 100% but more than 85% of the equilibrium relative humidity of the sugar at said drying temperature.*

* * * * *